Feb. 16, 1943.       H. ZIGAN       2,311,321
STEERING DEVICE AID FOR HEAVY MOTOR TRUCKS AND THE LIKE
Filed Jan. 20, 1942       2 Sheets-Sheet 1
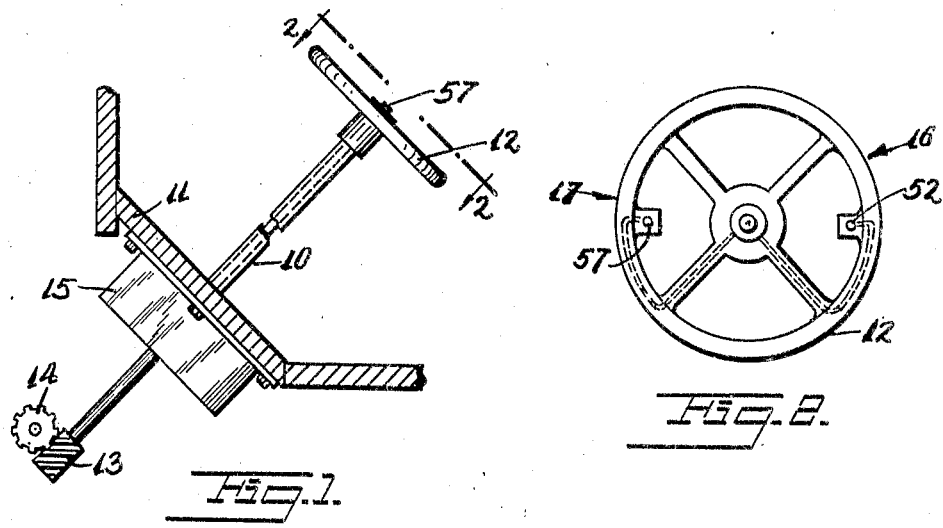
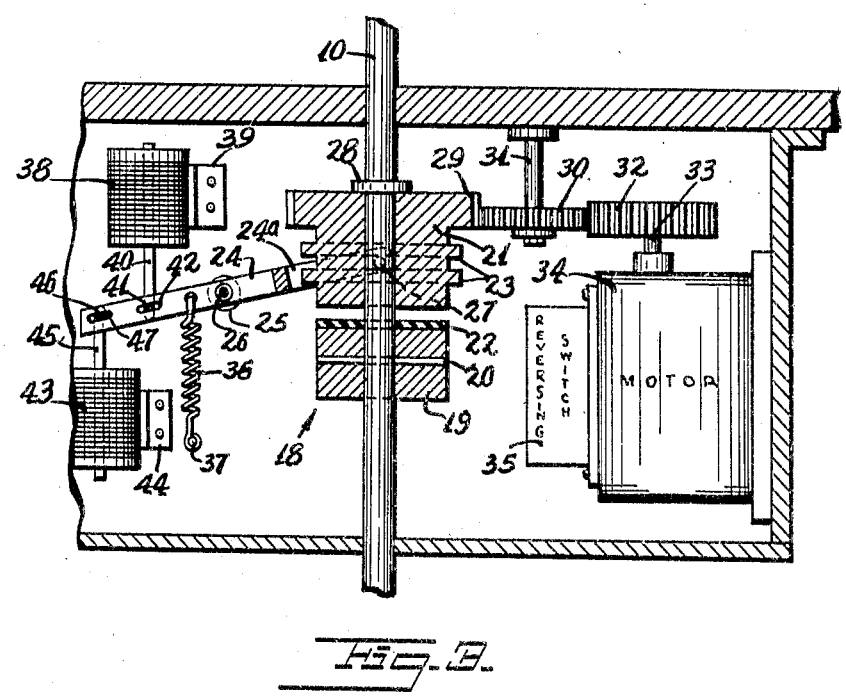
INVENTOR.
Herman Zigan
BY
ATTORNEY Patented Feb. 16, 1943

2,311,321

UNITED STATES PATENT OFFICE 2,311,321

STEERING DEVICE AID FOR HEAVY MOTOR TRUCKS AND THE LIKE

Herman Zigan, New York, N. Y.

Application January 20, 1942, Serial No. 427,426

7 Claims. (Cl. 180—79.1)

This invention relates to new and useful improvements in a steering device aid for heavy motor trucks and the like.

More specifically, the invention proposes the construction of a steering device aid for use on motor trucks and buses and characterized by a steering column having a clutch with a rotatable section connected by means of a transmission with an electric motor in a manner to cause the rotatable section to be rotated by the motor when the motor is in operation.

Still further it is proposed to provide an electrically controlled means for closing the clutch to cause rotations of the rotatable section to be transferred to the steering column to assist the driver in turning the steering column.

A further object of the invention is the provision of a reversing switch controlled by gang switches mounted upon the steering wheel for reversing the supply of current to the motor in a manner to cause the motor to rotate in one direction or the other to assist the driver in turning the steering column to the left or the right.

It is a further object of this invention to provide a rheostat in the circuit which supplies current to the electric motor to control the amount of current supplied to the motor to keep the supply of current just below the amount required to turn the steering column independently of the driver in a manner to require only a minimum of effort on the part of the driver to turn the steering column.

For further comprehension of this invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a steering column of a truck or bus provided with a steering aid constructed in accordance with this invention.

Fig. 2 is a view looking in the direction of the line 2—2 of Fig. 1.

Fig. 3 is a vertical sectional view of a portion of Fig. 1.

Figure 4:
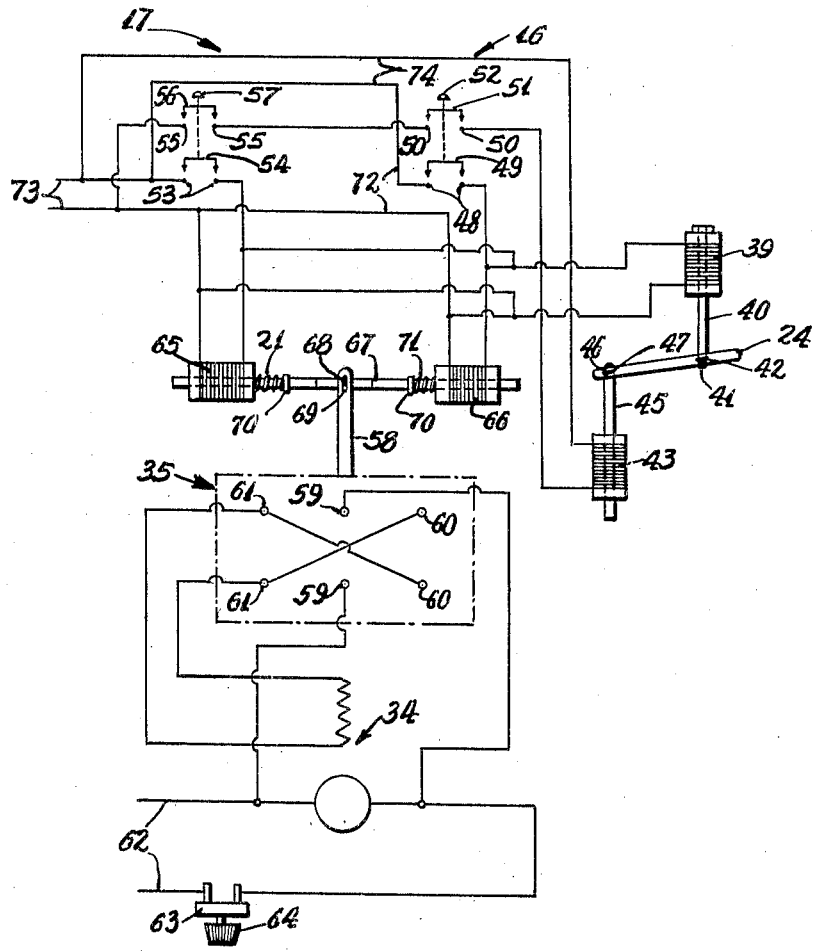
Fig. 4 is a schematic wiring diagram of the device.

The steering device aid for heavy motor trucks, buses and the like, according to this invention, includes a steering column 10 extended through the floor boards 11 of a motor vehicle and which is provided at its top end with the usual steering wheel 12. The bottom end of the steering column is provided with a worm pinion 13 meshing with a worm gear 14. The worm gear is connected by a means not shown on the drawings, with the front wheels of the motor vehicle for causing the vehicle to be turned when the steering wheel is turned.

Mounted on the bottom face of the floor boards 11 within a casing 15 is a means controlled by a right hand gang switch 16 and a left hand gang switch 17 for assisting the driver in turning the steering column either to the right or to the left. As shown in Fig. 2 the gang switches 16 and 17 are mounted on diametrically opposite sides of the steering wheel 12 within convenient reach of the driver.

This steering aid means is characterized by a clutch 18 mounted upon a portion of the steering column within the casing 15. The clutch 18 comprises a fixed section 19 which is locked to the steering column by means of a pin 20 extended through the section 19 and the steering column 10. On the steering column 10 adjacent the fixed section 19 the clutch further includes a section 21 which is rotatively and slidably mounted on the steering column 10. On the section 19 between the adjacent faces of the sections 19 and 21 there is provided a friction element 22 which is adapted to be engaged by the rotatively mounted section 21 for locking the section 21 to the section 19 which in turn is locked to the steering column 10 by means of the pin 20.

The section 21 intermediate of its ends is provided with a pair of spaced collars 23. A lever 24 is pivotally supported upon a bracket 25 extending from one wall of the casing 15. A pin 26 passing through an opening formed in the lever 24 engages the bracket 25 and forms the pivotal support for the lever. One end of the lever is bifurcated and has its arms 24ª extending along opposite sides of the movable section 21 of the clutch 18. These arms 24ª are formed with inwardly extending pins 27 which freely engage between the adjacent faces of the collars 23 mounted upon the free section 21. The pins 27 do not interfere with a free rotation of the section 21, but as the lever 24 is pivoted the engagement of the pins 27 with the collars 23 cause the section 21 to move longitudinally along the steering column 10 to engage and disengage the section 21 with the section 19. In the fully opened position of the sections 19 and 21 the section 21 is adapted to strike a collar 28 mounted upon the steering column 10 to arrest further upward movement of the section 21.

On a portion of its periphery the section 21 of the clutch 18 is provided with gear teeth 29 which mesh with the teeth of a gear 30. The gear 30 is rotatively supported upon a bracket 31 mounted upon the bottom face of the floor board 11. A gear 32 meshes with the gear 30. The gear 32 is mounted upon the extended shaft 33 of an electric motor 34 mounted upon a wall of the casing 15. Thus, as the shaft 33 of the electric motor 34 rotates its rotations will be transmitted to the section 21 of the clutch 18 through the medium of the gears 30 and 32 to similarly rotate the section 21.

A reversing switch 35 is mounted upon the housing of the electric motor 34 and is controlled by the closing of the gang switch 16 or the gang switch 17 to cause the motor to rotate in one direction or the other to cause the steering column to be turned either to the left or the right in the closed condition of the clutch. Details of this portion of the construction will be hereinafter given.

A spring 36 has one attached to the lever 24 on the side of the bracket 25 opposed to the end of the lever which is bifurcated. The other end of the spring 36 is attached to a pin 37 extending from the casing 15 for urging the lever 24 into a position in which the section 21 will be spaced from the section 19 of the clutch 18.

A solenoid 38 is mounted upon a bracket 39 extending from the wall of the casing 15. The solenoid 38 has a core 40 provided at its free end with a pin 41 which engages an elongated slot 42 formed in the lever 24. The solenoid 38 is adapted to be energized by closing either of the gang switches, as will be hereinafter described, to pivot the lever 24 against the holding action of the spring 36. When this pivoting takes place the section 21 of the clutch 18 is moved towards the fixed section 19 to contact the friction element 22 and close the clutch 18 to cause rotations of the motor 34 to be transmitted to the steering column. This will cause the steering column 10 to be turned in one direction or the other depending upon the direction in which motor is turning as controlled by the reversing switch 35. When the closed gang switch is again opened the circuit to the solenoid 38 will be broken and the lever will be free to be pivoted back to its normal position by the spring 36 to again open the clutch 18 and permit the steering column to be independently turned if desired.

Auxiliary means is provided for pivoting the lever 24 back to its normal position in which the clutch 18 is open in the event the spring becomes inoperative due to breakage or due to some other cause. This means comprises a solenoid 43 mounted upon a bracket 44 extending from a wall of the casing 15. A core 45 extends from the solenoid 43 and is provided at its outer end with a pin 46 engaging an elongated slot 47 formed in the lever 24. This solenoid 43 is connected in a circuit, the details of which will be hereinafter given, which requires the simultaneous closing of both the gang switches 16 and 17 for its energization. When both of these switches 16 and 17 are closed the solenoid 43 is energized pulling the lever back to its normal position against the holding action of the solenoid 38.

The right gang switch 16 comprises a pair of bottom contacts 48 adapted to be closed by a bar 49 and a pair of top contacts 50 adapted to be closed by a bar 51. The bars 49 and 51 are connected to a single depressible button 52 to cause the contacts 48 and 50 to be simultaneously closed.

The left gang switch 17 comprises a pair of bottom contacts 53 closed by means of a bar 54 and a pair of top contacts 55 adapted to be closed by means of a bar 56. The bars 54 and 56 are connected to a single depressible button 57 to cause the contacts 53 and 55 to be simultaneously closed.

The reversing switch 35 is of conventional construction and has a swingable arm 58 having a normal neutral position in which all the contacts of the switch are open and no current is supplied to the motor 34. Movement of the arm 58 is in one direction or the other causing the connection of a pair of contacts 59 with a pair of contacts 60 or a pair of contacts 61. The contacts 60 and 61 are mounted on opposite sides of the contacts 59 and when selectively closed with the contacts 59 cause the motor to rotate in one direction or the other. The switches 59, 60 and 61 and the motor 34 are mounted in a circuit 62 for supplying the required current to the motor.

Also mounted in the circuit 62 there is a rheostat 63 having a turnable knob 64 for varying the amount of current supplied to the motor 34 by the circuit 62. This rheostat is to be adjusted to supply a quantity of current slightly less than is actually needed to turn the steering column 10. Thus, when aided by a little effort on the part of the driver, the combined effort of the driver and the motor 34 will be sufficient to turn the steering wheel in the desired direction.

Means is provided for pivoting the arm 58 of the reversing switch 35 to close the circuit 62 through the contacts 60 or 61 to cause the motor 34 to turn in one direction or the other. This means comprises a pair of fixedly mounted spaced solenoids 65 and 66. A single core 67 has its ends extended into the solenoids 65 and 66 and is provided at its center with a pin 68. The pin 68 engages a vertical slot 69 formed in the top end of the arm 58. The core 67 at points spaced from the inner ends of the solenoids 65 and 66 is provided with a pair of collars. Springs 71 are concentrically mounted upon the core 67 and operate between the collars 70 and the solenoids 65 and 66 for urging the core 67 into a neutral position in which the reversing switch will be open and no current will be supplied to the motor 34.

A circuit 72 includes a source of power the contacts 48 of the gang switch 16, the solenoid 66 and the solenoid 39. Thus, when the button 52 of the right gang switch is pushed it will close the circuit 72 through the contacts 48. This will energize the solenoid 39 and pivot the lever 24 to close the clutch 18. Simultaneously the solenoid 66 will be energized drawing the core 67 to the right to pivot the arm 58 and close the circuit 62 through the contacts 60 and rotate the motor 34 towards the right to similarly rotate the steering column through the medium of the closed clutch. Upon releasing the button 52 the gang switch 16 will open breaking the circuit 72 deenergizing the solenoids 39 and 66. The spring 36 will pivot the lever 24 back to its normal position to open the clutch and the spring 71 will draw the bar 67 to its normal position breaking the circuit 62 through the reversing switch 35.

A circuit 73 includes a source of power the contacts 53 of the left gang switch 17, the solenoid 65 and the solenoid 39. Thus, when the button 57 of the left gang switch 17 is pushed in, it will close the circuit 73 through the contacts 53. This will energize the solenoid 39 and pivot the lever 24 to close the clutch 18. At the same instant, the solenoid 65 will be energized drawing the core 67 to the left to pivot the arm 58 and close the circuit 62 through the contacts 61 of the reversing switch 35 and rotate the motor 34 towards the left to similarly rotate the steering column 10 through the medium of the closed clutch 18 and assist the driver in turning the column 10. Upon releasing the button 57 the gang switch 17 will open breaking the circuit 73 deenergizing the solenoids 39 and 65. The spring 36 will pivot the lever 24 back to its normal position to open the clutch 18 and the springs 71 will draw the bar 67 back to its normal position breaking the circuit 62 stopping the motor 34.

Still another circuit 74 connects a source of power, the top contacts 55 of the gang switch 17, the top contacts 50 of the gang switch 16 and the solenoid 43 together in series. This requires that both the buttons 52 and 57 be simultaneously depressed to complete the circuit to energize the solenoid 43 to draw the lever 24 back to its normal position in the event the spring 36 becomes inoperative for this purpose. This simultaneous closing of the gang switches 16 and 17 also simultaneously closes the circuits 72 and 73 energizing both the solenoids 65 and 66 to counteract each other and permit the springs 71 to draw the bar 67 back to its neutral position and open the reversing switch 35. These gang switches 16 and 17 are to be simultaneously closed only in the case of an emergency or when something goes wrong with the spring 36.

The operation of the device is as follows:

When the left hand gang switch 17 is closed by depressing its button 57 the circuit 73 is closed to energize the solenoids 65 and 39. The solenoid 39 closes the clutch 18 and the solenoid 65 closes the circuit 62 through the contacts 61 to rotate the motor 34 towards the left and similarly rotate the steering column 10.

If it is desired to steer the vehicle to the right, the right hand gang switch 16 is closed by depressing the button 52 to close the circuit 72. The circuit 72 energizes the solenoids 39 and 66. The solenoid 39 pivots the lever 24 to close the clutch 18 and the solenoid 66 pivots the arm 58 to close the circuit 62 through the contacts 60 and cause the motor 34 to be rotated towards the right.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A steering device aid for heavy motor trucks and the like, comprising the usual steering column which is provided with a steering wheel, a right hand gang switch and a left hand gang switch mounted on said steering wheel, a steering motor controlled with a reversing switch having a neutral position, a transmission connecting said motor and steering column and including a clutch, a spring for urging said clutch into an open position, solenoid means for closing said clutch operated by one section of each of said gang switches, a solenoid means for operating said reversing switch to cause said steering motor to rotate in one direction when one of said gang switches is closed and to rotate said motor in the other direction when the other of said gang switches is closed and to move said reversing switch to a neutral position to cutout said motor when both of said gang switches are closed, and solenoid means for urging said clutch into an open position when both of said switches are closed.

2. A steering device aid for heavy motor trucks and the like, comprising the usual steering column which is provided with a steering wheel, a right hand gang switch and a left hand gang switch mounted on said steering wheel, a steering motor controlled with a reversing switch having a neutral position, a transmission connecting said motor and steering column and including a clutch, a spring for urging said clutch into an open position, solenoid means for closing said clutch operated by one section of each of said gang switches, a solenoid means for operating said reversing switch to cause said steering motor to rotate in one direction when one of said gang switches is closed and to rotate said motor in the other direction when the other of said gang switches is closed and to move said reversing switch to a neutral position to cutout said motor when both of said gang switches are closed, and solenoid means for urging said clutch into an open position when both of said switches are closed, and a rheostat for controlling the amount of current supplied to said motor so as to require a combined effort on the part of the motor and the driver to turn said steering column.

3. A steering device aid for heavy motor trucks and the like, comprising the usual steering column which is provided with a steering wheel, a right hand gang switch and a left hand gang switch mounted on said steering wheel, a steering motor controlled with a reversing switch having a neutral position, a transmission connecting said motor and steering column and including a clutch, a spring for urging said clutch into an open position, solenoid means for closing said clutch operated by one section of each of said gang switches, a solenoid means for operating said reversing switch to cause said steering motor to rotate in one direction when one of said gang switches is closed and to rotate said motor in the other direction when the other of said gang switches is closed and to move said reversing switch to a neutral position to cutout said motor when both of said gang switches are closed, and solenoid means for urging said clutch into an open position when both of said switches are closed, each of said gang switches comprising two sets of contacts, a bar for closing each set of contacts, and a depressible button connecting said bars together for unitary movement when said button is depressed.

4. A steering device aid for heavy motor trucks and the like, comprising the usual steering column which is provided with a steering wheel, a right hand gang switch and a left hand gang switch mounted on said steering wheel, a steering motor controlled with a reversing switch having a neutral position, a transmission connecting said motor and steering column and including a clutch, a spring for urging said clutch into an open position, solenoid means for closing said clutch operated by one section of each of said gang switches, a solenoid means for operating said reversing switch to cause said steering motor to rotate in one direction when one of said gang switches is closed and to rotate said motor in the other direction when the other of said gang switches is closed and to move said reversing switch to a neutral position to cutout said motor when both of said gang switches are closed, and solenoid means for urging said clutch into an open position when both of said switches are closed, said clutch comprising, a fixed section mounted on said steering column, a movable section slidably and rotatively engaged upon said steering column, a lever pivotally mounted intermediate of its ends and having one end connected with said movable section to move said movable section towards said fixed section when pivoted.

5. A steering device aid for heavy motor trucks and the like, comprising the usual steering column which is provided with a steering wheel, a right hand gang switch and a left hand gang switch mounted on said steering wheel, a steering motor controlled with a reversing switch having a neutral position, a transmission connecting said motor and steering column and including a clutch, a spring for urging said clutch into an open position, solenoid means for closing said clutch operated by one section of each of said gang switches, a solenoid means for operating said reversing switch to cause said steering motor to rotate in one direction when one of said gang switches is closed and to rotate said motor in the other direction when the other of said gang switches is closed and to move said reversing switch to a neutral position to cutout said motor when both of said gang switches are closed, and solenoid means for urging said clutch into an open position when both of said switches are closed, said clutch comprising, a fixed section mounted on said steering column, a movable section slidably and rotatively engaged upon said steering column, a lever pivotally mounted intermediate of its ends and having one end connected with said movable section to move said movable section towards said fixed section when pivoted, and a spring connected to the free end of said lever for pivoting said lever to separate said sections, and said solenoid means for closing said clutch being also connected to the free end of said lever to counteract the action of said spring when energized to close said clutch by pivoting said lever.

6. A steering device aid for heavy motor trucks and the like, comprising the usual steering column which is provided with a steering wheel, a right hand gang switch and a left hand gang switch mounted on said steering wheel, a steering motor controlled with a reversing switch having a neutral position, a transmission connecting said motor and steering column and including a clutch, a spring for urging said clutch into an open position, solenoid means for closing said clutch operated by one section of each of said gang switches, a solenoid means for operating said reversing switch to cause said steering motor to rotate in one direction when one of said gang switches is closed and to rotate said motor in the other direction when the other of said gang switches is closed and to move said reversing switch to a neutral position to cutout said motor when both of said gang switches are closed, and solenoid means for urging said clutch into an open position when both of said switches are closed, said clutch comprising, a fixed section mounted on said steering column, a movable section slidably and rotatively engaged upon said steering column, a lever pivotally mounted intermediate of its ends and having one end connected with said movable section to move said movable section towards said fixed section when pivoted, and a friction element arranged between the adjacent faces of said clutch sections.

7. A steering device aid for heavy motor trucks and the like, comprising the usual steering column which is provided with a steering wheel, a right hand gang switch and a left hand gang switch mounted on said steering wheel, a steering motor controlled with a reversing switch having a neutral position, a transmission connecting said motor and steering column and including a clutch, a spring for urging said clutch into an open position, solenoid means for closing said clutch operated by one section of each of said gang switches, a solenoid means for operating said reversing switch to cause said steering motor to rotate in one direction when one of said gang switches is closed and to rotate said motor in the other direction when the other of said gang switches is closed and to move said reversing switch to a neutral position to cutout said motor when both of said gang switches are closed, and solenoid means for urging said clutch into an open position when both of said switches are closed, said reversing switch having a pivotally mounted arm connected with said solenoid means for operating said reversing switch.

HERMAN ZIGAN.